(12) United States Patent
Shenoi et al.

(10) Patent No.: US 9,860,003 B2
(45) Date of Patent: Jan. 2, 2018

(54) METHOD FOR PROVIDING TIME HOLDOVER IN PACKET-BASED TIMING DEPLOYMENTS

(71) Applicant: QULSAR, INC., San Jose, CA (US)

(72) Inventors: Kishan Shenoi, Saratoga, CA (US); Rajendra Nath Datta, San Jose, CA (US)

(73) Assignee: Qulsar, Inc., San Jose, CA (US)

( * ) Notice: Subject to any disclaimer, the term of this patent is extended or adjusted under 35 U.S.C. 154(b) by 0 days.

(21) Appl. No.: 14/320,146

(22) Filed: Jun. 30, 2014

(65) Prior Publication Data

US 2015/0003479 A1    Jan. 1, 2015

Related U.S. Application Data

(60) Provisional application No. 61/841,917, filed on Jul. 1, 2013.

(51) Int. Cl.
*H04J 3/06* (2006.01)
*H04L 12/26* (2006.01)

(52) U.S. Cl.
CPC ........... *H04J 3/0661* (2013.01); *H04J 3/0644* (2013.01); *H04J 3/0667* (2013.01); *H04J 3/0688* (2013.01); *H04L 43/0858* (2013.01); *H04L 43/106* (2013.01)

(58) Field of Classification Search
CPC ........ H04J 3/0644; H04J 3/065; H04J 3/0661; H04J 3/0658; H04J 3/0667; H04J 3/0688; H04L 43/106
See application file for complete search history.

(56) References Cited

U.S. PATENT DOCUMENTS

| 2009/0086764 A1* | 4/2009 | Lee ................. H04L 69/28 370/503 |
| 2009/0276542 A1* | 11/2009 | Aweya ............. H04J 3/0667 709/248 |
| 2011/0135047 A1* | 6/2011 | Tournier ........... G05B 19/0421 375/356 |

\* cited by examiner

*Primary Examiner* — Kan Yuen
(74) *Attorney, Agent, or Firm* — John Bruckner PC

(57) ABSTRACT

A packet network that includes the distribution of timing information (time and frequency) between server and client devices can continue to operate in a holdover mode even when the server loses its primary timing reference based on GNSS. This is achieved by populating the packet network with some client devices that also have access to the same timing reference. These devices are used in a reverse timing transfer mode to provide a back-up reference to the server and thereby provide a graceful solution to the problem of loss of reference.

8 Claims, 4 Drawing Sheets

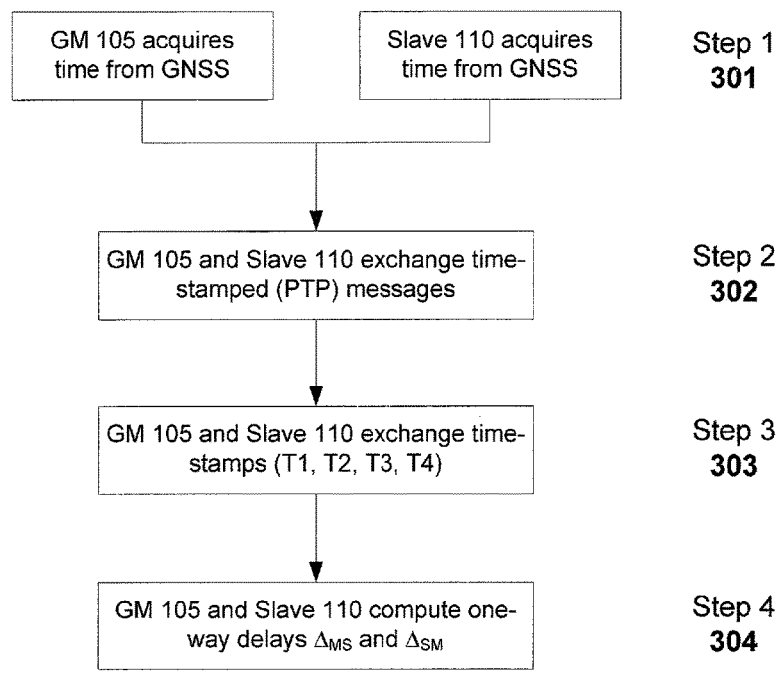
Figure 3. Flow diagram depicting development of one-way delay estimates

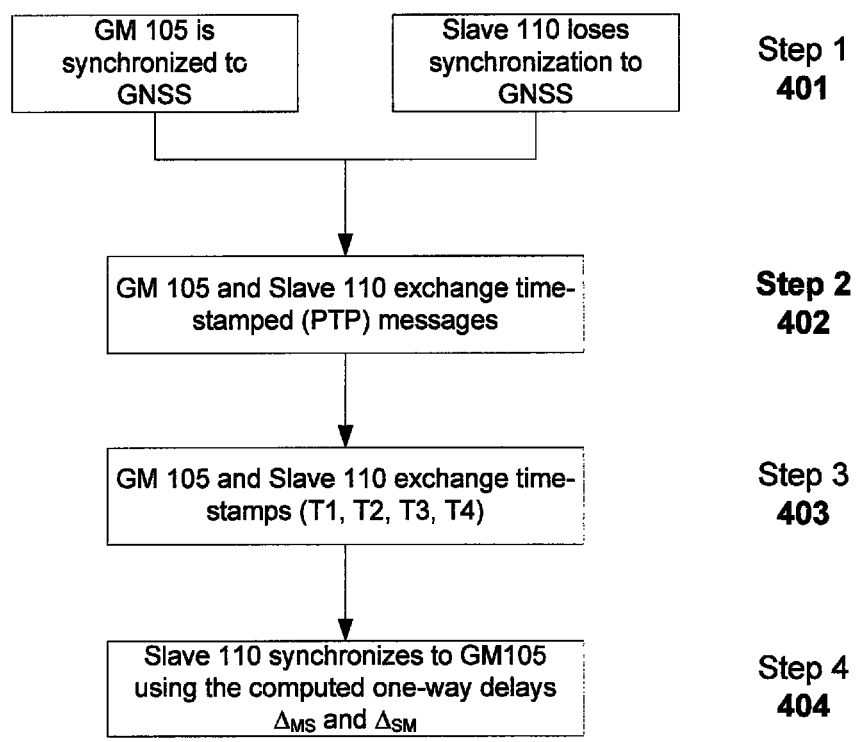
Figure 4. Flow diagram depicting first holdover case

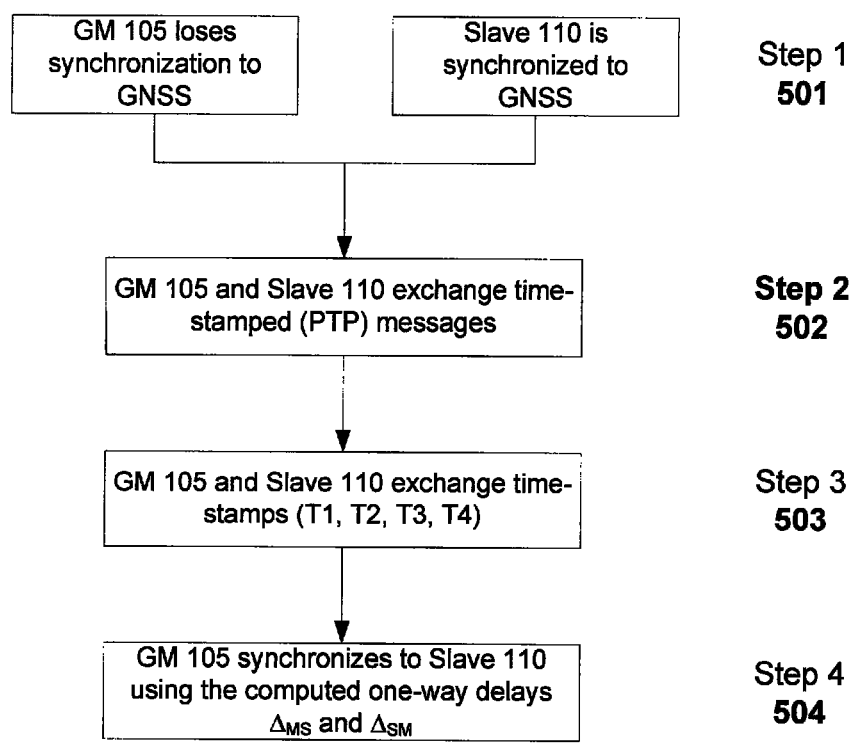
Figure 5. Flow diagram depicting second holdover case

METHOD FOR PROVIDING TIME HOLDOVER IN PACKET-BASED TIMING DEPLOYMENTS

CROSS-REFERENCE TO RELATED APPLICATION

Referring to the application data sheet filed herewith, this application claims a benefit of priority under 35 U.S.C. 119(e) from provisional patent application U.S. Ser. No. 61/841,917, filed Jul. 1, 2013, the entire contents of which are hereby expressly incorporated herein by reference for all purposes.

BACKGROUND OF INVENTION

Field of the Invention

Embodiments of the present invention relate generally to time and frequency alignment systems operating over packet-switched communications networks and, more specifically, to methods and apparatus for providing holdover when the primary timing reference source loses its traceability to UTC.

Description of the Problem and Related Prior Art

Packet-based timing methods are becoming essential for delivering timing over packet-switched networks, often referred to as the cloud. In particular, Precision Timing Protocol (PIP) (aka IEEE 1588-2008) is becoming popular for delivering timing information (time/phase/frequency) from a Grand Master (GM) clock to slave clocks in end application-specific equipment. For example, wireless base stations providing mobile telephony services require precise timing and the backhaul method of choice is Ethernet.

The Grand Master clock provides timing information over the packet-switched network to the slave clocks by exchanging packets with embedded time-stamps related to the time-of-arrival and time-of-departure of the timing packets. The slave clock utilizes this information to align its time (and frequency) with the Grand master. The Grand Master is provided an external reference to serve as the basis for time and frequency. Most commonly this reference is derived from a Global Navigation Satellite System (GNSS) such as the GPS System that in turn is controlled by the US Department of Defense and its timing controlled very precisely and linked to the US Naval Observatory. Time alignment to the GPS clock is, for all practical purposes equivalent to time alignment to UTC.

The Grand Master clock is equipped with a high stability oscillator, typically an ovenized quartz oscillator (OCXO) or a Rubidium atomic standard. The intent is to allow the clock to go into holdover mode and bridge intervals of time when the GPS system is unavailable. That is, if the GPS becomes unavailable, the GM can utilize the local oscillator to "keep time". The ability to maintain a specified accuracy is directly linked to the quality of the local oscillator.

When a GM loses its reference and goes into holdover mode the system of PTP slave clocks that are synchronizing themselves with the said GM may choose to establish an alternate GM to which they will switch to. However, this involves a significant time delay and in the duration the slave clocks could drift to the extent that the application, such as the mobile telephony system, may experience unacceptable outage.

SUMMARY

There is a need for the following embodiments of the present disclosure. Of course, the present disclosure is not limited to these embodiments.

According to an embodiment of the present disclosure, a method comprises: characterizing properties of a packet-based communication link between a server clock and a client clock using a time reference available at both the server clock and the client clock.

According to another embodiment of the present disclosure, an apparatus comprises: a packet-based timing deployment including a server clock and a client clock coupled to the server clock, wherein a time reference is available at both the server clock and the client clock.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

BRIEF DESCRIPTION OF THE DRAWINGS

FIG. 3 is a flow diagram that depicts the development of one-way delay estimates between the domain GM and the GNSS-equipped slave.

FIG. 4 is a flow diagram depicting a first holdover situation where the GNSS-equipped slave loses GNSS and synchronizes to the domain grandmaster.

FIG. 5 is a flow diagram depicting a second holdover case where the grand master loses GNSS and uses the GNSS-equipped slave as a holdover timing source.

DETAILED DESCRIPTION

Embodiments of the disclosure can provide a method to keep the grand master (GM) that is in holdover suitably accurate by providing it with additional timing information from alternate devices that have access to GPS information. This eliminates the need for the slave devices to switch over to an alternate GM, reducing the probability of a mobile network (application) outage.

One or more embodiments of the invention provide techniques for delivering an alternate reference to the Grand Master in the event that it loses its primary GPS reference. A deployed arrangement of master and slave clocks (also referred to as server and client clocks, respectively) is depicted in FIG. 1.

Figure 1:
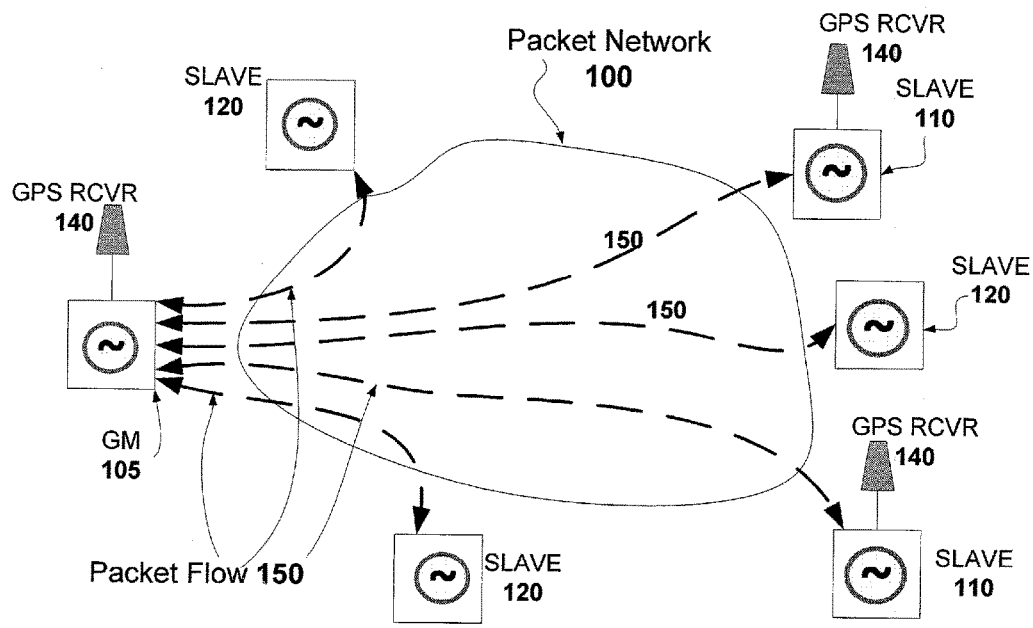
FIG. 1 is a conceptual diagram that illustrates a mobile telephony deployment in terms of the timing and synchronization aspect of the packet network.

FIG. 1 is a conceptual diagram that illustrates a mobile telephony deployment in terms of the timing and synchronization aspect of the network 100. At each cellular base station, also referred to as a Node-B and in the case of packet-network interconnect as an eNode-B, there is a slave clock 120 (and 110) that must be synchronized with all the other clocks in base stations that collectively comprise the cellular access network. The clocks are synchronized by aligning each one to a grand master clock 105. The grand master clock develops its timing reference from a Global Navigation Satellite System (GNSS) such as GPS using a GPS receiver (with GPS antenna) 140. The conventional slave clock 120 aligns with the grandmaster and a second type of slave clock 110 (demi-master) communicates with the grandmaster but also has available a timing reference from a GNSS. The slave GNSS reference will nominally be the same as that of the grand master. In the example shown the clocks and their interactions, and the terminology used, are governed by the PTP (Precision Timing Protocol), also referred to as IEEE 1588 which is the designation of the standard. In the example considered the GNSS of choice is the GPS system. The timing information is carried using packets and there is a packet flow 150 between the grandmaster and each of the slave clocks that are in the alignment set. In normal operation, since the slave clocks are all synchronized directly or indirectly to a common reference, the GNSS, they are all mutually aligned in time and frequency. For specificity and simplicity of explanation it is assumed that the network does not provide on-path support in the form of transparent clocks or boundary clocks but the extension of the concepts described herein are easily extended to the case where the network provides on-path support or partial on-path support. With this assumption it suffices to refer to the grand master in FIG. 1 as simply master.

Figure 2:
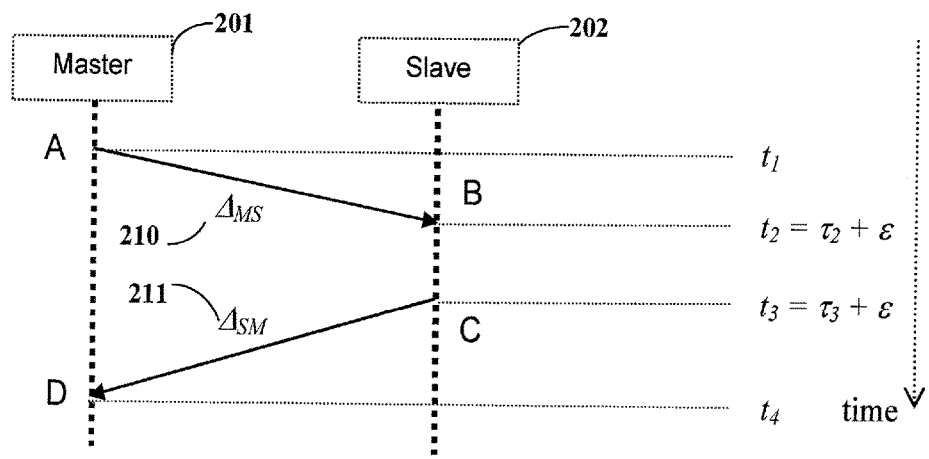
FIG. 2 is a diagram that identifies the time-stamps and events associated with the timing signal in a packet-based synchronization method.

The manner in which the slave clocks align themselves with the master is explained using FIG. 2. Packet exchanges between master and slave provide measurements of the transit delay between the two. The particular protocol employed determines the method whereby the measurements ("time-stamps") are communicated between the two entities. This protocol can be, for example, PIP or NTP. Both are supported by packet networks in a transparent fashion.

Referring to FIG. 2, the sequence of events and important items of information associated with an exchange of packets between master and slave are:

Event A: Packet is transmitted by master and time-of-departure is $t_1$.

Event B: Packet arrives at slave that measures the time-of-arrival as $\tau_2$; assuming that the slave time offset from master (ofm) is $\epsilon$, the actual time-of-arrival is $t_2 = \tau_2 + \epsilon$.

Event C: Packet is transmitted by slave that notes the time-of-departure is $\tau_3$; assuming that the slave time offset from master is $\epsilon$, the actual time-of-departure is $t_3 = \tau_3 + \epsilon$.

Event D: Packet arrives at master that measures time-of-arrival as $t_4$.

From a nomenclature point of view, the 4 time-stamps are referred to as T1, T2, T3, and T4 where T1 and T3 correspond to the time-of-departure of packets and T2 and T4 correspond to the time-of-arrival of packets. Such a two-way exchange of packets can provide information suitable for allowing the slave to align in time with the master (assuming that both sides have knowledge of the time stamps). If the exchange of information is only one-way, from master to slave (referred to as the forward direction), the slave can still align its clock (frequency) with the master (syntonization) since the packet contains the time-of-departure from the master ($t_1$) and the slave measure the time-of-arrival ($\tau_2$). One-way methods, where the time-stamped packets flow from slave to master can be employed provided the mechanism is available for the slave to obtain the results of the master measuring time-of-arrival at the master ($t_4$).

There are four measured values that can be communicated between the master and slave, namely, ($t_1$, $\tau_2$, $\tau_3$, $t_4$). Note that such a two-way exchange involves one packet (message) in each direction; they do not necessarily have to be consecutive as long as the time-stamp information is communicated appropriately. In some instances the rate at which packets are transmitted in the two directions can be different. Denoting by $\Delta_{MS}$ and $\Delta_{SM}$ the transit delays between the master and slave and vice versa, the following equations can be established:

$$t_4 = \tau_3 + \epsilon + \Delta_{SM} \text{ (from an S-to-M packet)}$$

$$t_1 = \tau_2 + \epsilon - \Delta_{MS} \text{ (from a M-to-S packet)} \qquad (1)$$

In an actual time-transfer situation there are two equations with three unknowns so it is common to assume reciprocity of transit delay between the two devices, thereby reducing the number of unknowns to 2 and therefore computing $\epsilon$, the slave time offset from master from (Eq. 2).

$$\varepsilon = \frac{(t_4 + t_1) - (\tau_3 + \tau_2)}{2} = \frac{(t_4 - \tau_3) - (\tau_2 - t_1)}{2} \qquad \text{(Eq. 2)}$$

Because of the fundamental statistical behavior of packet networks, the transit delays are not fixed and can vary from packet to packet. To counter this packet delay variation, as well as to account for any drift in the slave clock oscillator, the estimates of clock offset are made routinely and it is well known that the mitigation of the deleterious effects of packet delay variation and oscillator drift is improved by using more frequent exchanges of timing packets. Ordinary slaves 120 develop their estimate of time offset from master based on (Eq. 2).

A common approach to controlling the slave clock is to utilize one-way transmissions to control the frequency of the slave clock. That is, the local slave clock frequency is brought into alignment with the master clock frequency. Based on the assumption that the one-way delay is constant, a control loop for controlling the frequency of the slave clock is established by generating a control voltage that is the function of the difference between sequential estimates of the one-way delay. Since the observation noise is related to packet-delay variation, and based on the fundamental principle that delay cannot be less than zero, one-way delay estimates that are excessive are ignored. That is, packet-selection is performed with only a subset of packets, those that represent delay values close to the minimum delay, utilized to generate the clock-frequency control signal.

Frequency control of the slave clock can be achieved using packets in the forward (master-to-slave) direction or the reverse (slave-to-master) direction or a combination thereof. Once the frequency is stable, the time offset can be developed based on the principle of (Eq. 2) together with any packet selection procedure pre-applied.

GNSS-equipped slaves 110 that have a time reference that is equivalent to the grand master (e.g. UPS) can consider their clock to be aligned with the grand master. That is, they are slave clocks in a protocol sense but do not necessarily use the timing information in the packet flow to discipline their local clock. The timing information in the packet flow can, however, be used in conjunction with the local GNSS reference to improve the local clock of these slaves. In such devices the following equations provide estimates of the one-way delay between grand master and slave clock:

$$\Delta_{SM} = t_4 - \tau_3 \text{ (from an S-to-M packet)}$$

$$\Delta_{MS} = \tau_2 - t_1 \text{ (from a M-to-S packet)} \qquad (3)$$

This operation is depicted in the flow diagram of FIG. 3. In the first step 301 the slave 110 and the grand master 105 individually acquire time (and location) from the same GNSS (e.g. UPS).

The slaves 110 and the grandmaster 105 exchange PTP messages in a continual manner as in conventional PTP. In addition, the slaves 110 and grand master 105 exchange the time-stamps associated with the time-of-arrival and time-of-departure of the PTP packets. Since both the slaves 110 and the grandmaster 105 are synchronized to the common GNSS source, they do not have to use the time-stamps for clock control. Instead they use the time-stamps and knowledge that they are synchronized to a common source to estimate the one-way delays between them. That is, slaves 110 and grand master 105 maintain a record of the one-way delay between grand master 105 and themselves. Because of packet delay variation the estimates of delay can be varying and non-linear filtering algorithms can be used for mitigating the deleterious effect of this variation. Specifically, the minimum value of delay estimate is a measure of the true one-way delay. This is because the minimum delay is experienced when the load on the intervening network elements is small and when observed over an extended period of time it is statistically probable that a PTP packet will traverse the network when all intervening switches are experiencing low load. However, since the path taken by packets between master and slave may change, albeit an infrequent event, the delay is monitored continually.

The PTP protocol standard provides for communication between the various clocks involved in the network. In particular, the content packets involved in the regular communication of timing information can be augmented to include messages between the slaves and the grandmaster. Alternatively, a unicast messaging channel can be established between any chosen slave and the grandmaster. In one embodiment of the invention described here, such a messaging channel between each slave 110 and the grandmaster is established and used to carry the following information:

a. Identity of the slave. This information permits the master to distinguish the source of a received packet containing the pertinent information.

b. Status of the GNSS receiver at the slave. This information identifies whether the slave GNSS receiver is active and is receiving satisfactory satellite signals. That is, the information identifies whether the slave clock can utilize its GNSS receiver as a source of timing. Optionally the information includes performance metrics related to the GNSS receiver such the number of satellites visible, the signal-to-noise-ratio for each satellite, and quality measures related to the timing reference provided by the GNSS receiver.

c. Delay estimates. The slave can establish the one-way delay parameters $\Delta_{MS}$ and $\Delta_{SM}$ and communicate the current best estimate back to the grand master. Optionally metrics related to the delay variation can also be provided by the slave to the grand master.

Of special interest is the operation when the clock loses synchronization to the GNSS and must go into a "holdover" mode. This is traditionally done by relying on the performance of the local oscillator. Specifically, the frequency control signal governing the frequency of the oscillator is held constant at the last known good value that prevailed when synchronization to GNSS was operative. Here we describe a method that permits high-quality holdover wherein the ability of the other clock to synchronize to GNSS is utilized and the one-way delay estimates computed when both clocks were synchronized to GNSS are used to defeat the time delay asymmetry in the network path between the two clocks.

The first holdover situation is considered in the flow chart of FIG. 4. It is assumed in FIG. 4 that it is the slave clock 110 that loses synchronization to GNSS and must go into holdover. As indicated in step 2 402 the clocks exchange PTP messages and as indicated in step 3 403 the clocks exchange the relevant time-of-arrival and time-of-departure time-stamps. The slave clock 110 then utilizes these time-stamps in the conventional PTP synchronization method. The one-way delay estimates computed when both clocks were synchronized to GNSS are used to defeat the time delay asymmetry in the network path between the two clocks.

The second holdover situation is considered in the flow chart of FIG. 5. It is assumed in FIG. 5 that it is the grand master clock 105 that loses synchronization to GNSS and must go into holdover. As indicated in step 2 502 the clocks exchange PTP messages and as indicated in step 3 503 the clocks exchange the relevant time-of-arrival and time-of-departure time-stamps. The grandmaster clock 105 then utilizes these time-stamps in the conventional PIP synchronization method. The one-way delay estimates computed when both clocks were synchronized to GNSS are used to defeat the time delay asymmetry in the network path between the two clocks. In this scenario the grandmaster clock 105 function has been modified to resemble a boundary clock since it is synchronizing to a PTP (master) clock; the behavior of the slave 110 resembles that of a grand master, albeit with one slave that happens to be the domain grand master 105. Generally speaking the domain grand master 105 will be equipped with a high performance oscillator so the quality of synchronization to the slave 110 will be good.

Embodiments of the disclosure can include using a time reference at slave clock to establish properties of a communication link between slave and grandmaster, especially asymmetry and time delay variation. A computer readable medium can include non-transitory computer or machine readable program elements translatable for implementing a method of this disclosure.

If the GNSS reference at the slave fails, it can use the PIP stream(s) with the GM to maintain synchronization. The normally "unknown" time asymmetry is defeated by measuring it while both sides have active GNSS. (Caveat: This assumes that when the holdover is active there is no network rearrangement).

If the GM reference (PRTC) fails then the GM goes into holdover. It can use the PIP stream(s) with the designated slave(s) that has (have) GPS to maintain its time-clock. The normally "unknown" time asymmetry is defeated by measuring it while both sides have active GNSS. By monitoring the time delay variation as well as time delay, the GM can decide which slave has the best (least noisy) packet network between GM and Slave. (Caveat: This assumes that when the holdover is active there is no network rearrangement and no substantive change in network loading that could make the delay variation measurements incorrect).

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be combined in the disclosed configurations, but could be combined in any and all configurations.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

What is claimed is:

1. A method, comprising:
    operating a packet-based communication network between a domain grand master clock, a first client clock coupled to the domain grand master clock and a second client clock coupled to the domain grand master clock,
    providing time holdover in the packet based communication network when a time reference is not available at the domain grand master clock including:
        synchronizing the second client clock to the domain grand master clock; and
        synchronizing the domain grand master clock to the first client clock when the time reference is available at the first client clock but not at the domain grand master clock; and
    eliminating a need for the second client clock to switch over to an alternate grand master, reducing probability of a mobile network application outage,
    wherein the time reference is available at the second client clock and
    wherein the first client clock has the least noisy packet network with the domain grand master clock compared to the second client clock based on monitoring time delay variation as well as time delay.

2. The method of claim 1, wherein operating the communication link between the domain grand master clock and the first client clock includes exchanging time-stamps associated with the time-of-arrival and time-of-departure of precision timing protocol packets.

3. The method of claim 2, wherein operating includes calculating $\Delta_{SM} = t_4 - \tau_3$ (from an S-to-M packet)

$\Delta_{MS} = \tau_2 - t_1$ (from a M-to-S packet)

wherein $D_{MS}$ is a transit delay from the domain grand master clock to the first client clock and $D_{SM}$ is a transit delay from the first client clock to the domain grand master clock, wherein S denotes the first client clock and M denotes the domain grand master clock, wherein $t_1$ is a time-of-departure of a packet transmitted by the domain grand master clock and $t_2$ is a time-of-arrival of the packet transmitted by the domain grand master clock and wherein $t_3$ is a time-of departure of a packet transmitted by the first client clock and $t_4$ is a time-of-arrival of the packet transmitted by the first client clock.

4. The method of claim 3, wherein operating includes measuring asymmetry between the first client clock and the domain grand master clock.

5. The method of claim 3, further comprising providing time holdover in the packet based communication network including synchronizing the domain grand master clock to the first client clock using $D_{MS}$ and $D_{SM}$ when the time reference is available at the first client clock but not at the domain grand master clock.

6. A computer readable medium, comprising non-transitory computer or machine readable program elements translatable for implementing the method of claim 1.

7. An apparatus, comprising: a packet-based communication network including
    a domain grand master clock;
    a first client clock coupled to the domain grand master clock; and
    a second client clock coupled to the domain grand master clock,
        wherein time holdover is provided in the packet based communication network when a time reference is not available at one of the first client clock or the domain grand master clock including:
            synchronizing the second client clock to the domain grand master clock;
            synchronizing the first client clock to the domain grand master clock when the time reference is available at the domain grand master clock but not at the first client clock;
            synchronizing the domain grand master clock to the first client clock using packet-based synchronization when the time reference is available at the first client clock but not at the domain grand master clock; and
        eliminating a need for the second client clock to switch over to an alternate grand master, reducing probability of a mobile network application outage,
        wherein the time reference is available at the second client clock and
        wherein the first client clock has the least noisy packet network with the domain grand master clock compared to the second client clock based on monitoring time delay variation as well as time delay.

8. A mobile network comprising the apparatus of claim 7.

* * * * *